United States Patent [19]

Komatsu

[11] Patent Number: 4,961,710

[45] Date of Patent: Oct. 9, 1990

[54] MEMORY CARD CONNECTOR

[75] Inventor: Yasuhiro Komatsu, Osaka, Japan

[73] Assignee: Hosiden Electronics Co., Ltd., Yao, Japan

[21] Appl. No.: 330,267

[22] Filed: Mar. 29, 1989

[30] Foreign Application Priority Data

Apr. 8, 1988 [JP] Japan .............................. 63-47838[U]

[51] Int. Cl.⁵ ......................................... H01R 13/629
[52] U.S. Cl. .................................... 439/267; 439/260
[58] Field of Search ............... 439/259, 260, 261, 266, 439/267, 315, 326, 342, 345, 347, 92, 140, 141; 235/441, 480, 482, 492

[56] References Cited

U.S. PATENT DOCUMENTS

4,695,925  9/1987  Kodai et al. ........................ 361/395
4,735,578  4/1988  Reichardt et al. .................. 439/152
4,780,604 10/1988  Hasegawa et al. .................. 235/492
4,874,323 10/1989  Shibano .............................. 439/260

Primary Examiner—Eugene F. Desmond
Assistant Examiner—Walter G. Hanihuk
Attorney, Agent, or Firm—Jones, Tullar & Cooper

[57] ABSTRACT

A memory card connector arranged is related such that, at the time of initial insertion and removal of a memory card, the contact pieces of the connector do not come in contact with the external contact pieces of a memory card, thus preventing the operator from receiving the spring loads stored in the contact pieces, at the time of such insertion and removal. At a set position of the memory card, the slider engaged with the memory card is moved toward the contact pieces with the use of a raised guide surface. Accordingly, the contact pieces displaced against the resiliency thereof come in contact with the external contact pieces of the memory card.

6 Claims, 9 Drawing Sheets

MEMORY CARD CONNECTOR

Background of the Invention

1. Field of the Invention

The present invention relates to a connector for a memory card used as, for example, a credit card or a cash card, and more particularly to a memory card connector of which contact pieces are adapted to resiliently come in contact with the external contact pieces of a memory card by the resiliency of the contact pieces themselves.

2. Description of the Prior Art

A conventional connector of the type above-mentioned generally has contact pieces adapted to project toward the set position of a memory card at the time when the memory card is not being set. When setting the memory card, the memory card is inserted while pushing and driving away the contact pieces against the resiliency thereof, so that the contact pieces resiliently come in contact with the external contact pieces of the memory card. At the same time, the memory card is positioned and held at the set position by a lock mechanism of the connector. On the other hand, when pulling the memory card from the connector, the memory card is further pushed from the set position above-mentioned to release its state locked by the lock mechanism. Then, the memory card is pushed back from the set position with the contact pieces of the connector resiliently contacted with the external contact pieces of the memory card.

A number of external contact pieces are disposed in parallel at the end of the memory card such that each of the external contact pieces is adapted to come in contact with each of the contact pieces of the connector. It is therefore required that the connector incorporates a spring having a relatively great spring load capable of returning the memory card to the front side of the connector with all the contact pieces coming in contact with all the external contact pieces of the memory card.

However, this spring is so arranged as to push back the memory card by the spring load stored at the time when the memory card is inserted to the set position. If a spring having a great spring load is employed as such a spring, a force is required for inserting the memory card into the set position, which is greater than the composite force in which force for pushing and driving away all the contact pieces against their resiliency is added to the force corresponding to the spring load. Thus, the conventional connector as above-mentioned requires a great operating force for inserting the memory card into the connector.

Further, the spring used in the conventional connector has a complicated shape. This disadvantageously presents the problem that the connector is difficult to make thin in addition to a variety of other production and quality control problems.

SUMMARY OF THE INVENTION

The present invention is proposed in view of the problems above-mentioned with the object of providing a memory card connector in which the contact pieces thereof do not resiliently come in contact with the external contact pieces of a memory card when the memory card is set or pulled. This enables the use of a spring having a small spring load for pushing back the memory card, so that the operating force for pushing the memory card is reduced to improve maneuverability.

To achieve the object above-mentioned, the memory card connector in accordance with the present invention comprises:

a connector body;

contact pieces mounted on the connector body and positioned as projecting toward the set position of a memory card, the contact pieces being movable in a direction away from the set position above-mentioned;

a raised guide surface formed on the connector body;

a slider mounted on the connector body in a manner slidable in the front-to-back direction thereof, the slider being normally biased forward by resilient means;

a spacer disposed between the connector body and the slider in a manner movable in the front-to-back direction of the connector body;

an engagement portion disposed on the slider, the engagement portion being adapted to be opposite to the tip of the memory card when the same is inserted;

a pushing portion disposed on the slider such that, when the slider is pushed by the memory card, the pushing portion pushes the spacer so that the spacer gets over the guide surface from the front side thereof to the rear side thereof;

a hooking portion disposed, as separated from the pushing portion, on the slider such that, when the slider is pushed by the resilient means, the hooking portion catches the spacer, causing the spacer to get over the guide surface from the rear side thereof to the front side thereof; and a cam mechanism disposed between the connector body and the slider and arranged such that, when the spacer rides the top of the guide surface from the front, side thereof, the cam mechanism operates to hold the slider in the position where the memory card is held at the set position, and such that, when the slider is further pushed from the position above-mentioned such that the spacer gets over the tops of the raised portions of the guide surface, the cam mechanism operates to release the slider from the position above-mentioned.

According to the memory card connector having the arrangement above-mentioned, when a memory card is pushed with the tip thereof engaged with the engagement portion of the slider, the slider is pushed rearward against the spring load of the spring. With such movement, the spacer is pushed by the pushing portion of the slider, causing the spacer to ride the guide surface from the front side thereof. When the spacer reaches the top of the guide surface, the slider is positioned by the cam mechanism to hold the memory card at the set position. At this time, the contact pieces of the connector projecting to the set position are displaced and come in contact with the external contact pieces of the memory card, against the resiliency of the contact pieces.

When the memory card held at the set position is further pushed, causing the slider to be further pushed rearward, the spacer pushed by the pushing portion of the slider gets over the guide surface to release the state of the slider positioned by the cam mechanism. This causes the slider to be pushed back by the spring loads. At this time, the spacer caught by the hooking portion of the slider gets over the guide surface after passing the top thereof from the rear side thereof. However, while the contact portion of the slider with the spacer is being transferred from the pushing portion to the hooking portion of the slider before the spacer reaches the top of the guide surface, the external contact pieces of the memory card pass through the positions opposite to the contact pieces, i.e., the set position abovementioned. Thus, according to the memory card connector of the present invention, the external contact pieces of the memory card do not come in contact with the contact pieces of the connector, until the spacer just reaches the top of the guide surface at the initial insertion of the memory card and when the memory card is pulled out from the connector. This reduces the spring load for pushing back the memory card, as compared with that required in a conventional connector. Consequently, this reduces the pushing force required for insertion of the memory card, i.e., the operating force. Further, the use of a spring having a small spring load enables to simplifying the spring shape. This enables making the connector thinner and achieves production and quality control simplification.

The memory card connector in accordance with another embodiment of the present invention further comprises pawls adapted such that, when a memory card having a shutter which may take two positions, i.e., a first position to cover the external contact pieces of a memory card and a second position where the external contact pieces are exposed, is inserted into the body of the connector, the pawls are engaged with the shutter in the middle course of such insertion, thereby preventing the shutter from moving, causing the external contact pieces to be exposed.

Thus, this connector may be applied to the memory card having such a shutter. The pawls may be disposed on grounding terminals disposed at both sides of the contact pieces of the connector.

According to the memory card connector of the present invention, the spacer may be made in the form of a roller having a circular section. In this case, the spacer may come in contact with the slider in a wide area at a right angle to the slider moving direction. This assures a stable movement of the slider.

DETAILED DESCRIPTION OF THE PREFERRED EMBODIMENTS

Figure 1:
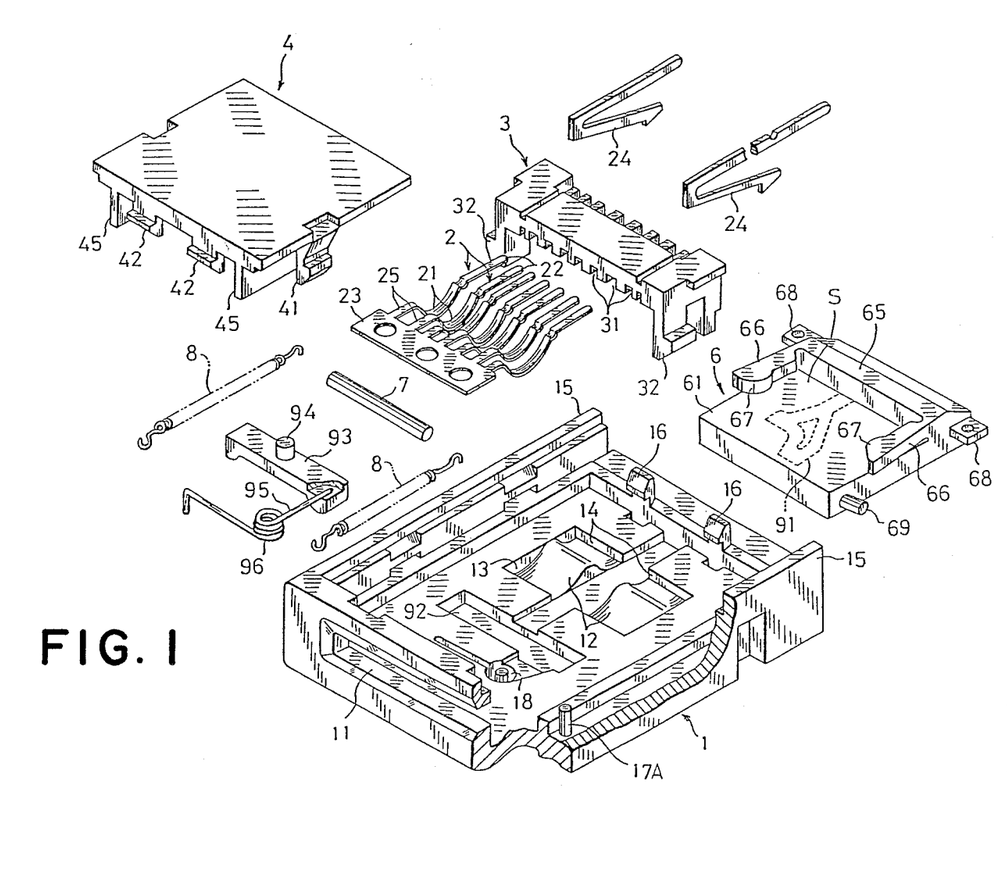
FIG. 1 is an exploded perspective view of a memory card connector in accordance with the present invention.

FIG. 1 schematically shows an exploded perspective view of a memory card connector in accordance with the present invention. As apparent from FIG. 1, a main body 1 is provided at the front end thereof with a card inserting and removing port 11, and on the bottom thereof with guide surfaces 12 having a section in the form of a mountain. Concave portions 13, 14 are respectively formed at the front and rear sides of each guide surface 12. Contact pieces 2 have, in a unitary structure, contacts 21 turned in the form of a circular arc and terminals 22 extending rearward from the contacts 21. Each of the contact pieces 2 is mounted in each of a predetermined number of grooves 31 formed in a holder 3.

Figure 4:
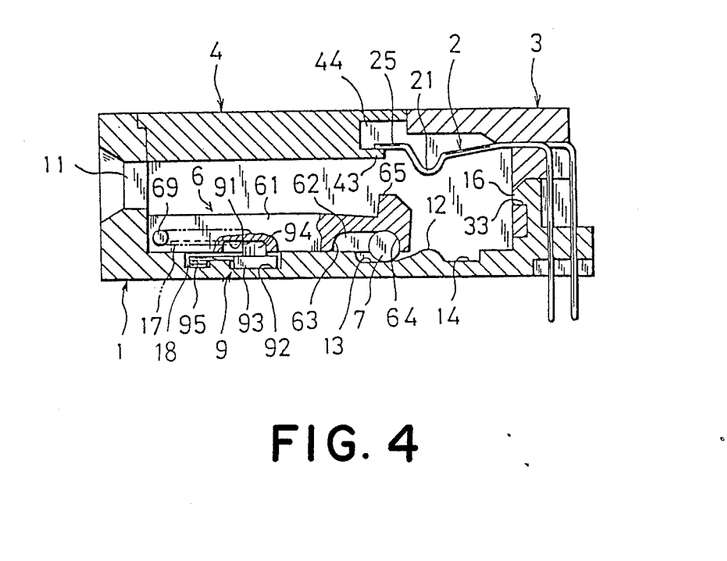
FIG. 4 is a vertical section view of the memory card connector in FIG. 1, in the memory card inserting direction.

At the time of assembling, a number of contact pieces 2 are united to one another with a tie bar 23. After the contact pieces 2 have been respectively mounted in the grooves 31, the tie bar 23 is separated from the contact pieces 2. Grounding terminals 24 may be mounted on the holder 3 as necessary. As shown in FIG. 1, the grounding terminals 24 are disposed at both sides of the contact pieces 2 and provided at the ends thereof with downwardly turned pawls 24a integral therewith. The holder 3 on which the contact pieces 2 and the grounding terminals 24 are mounted, is fitted to both lateral walls 15 of the main body 1. That is, the holder 3 is assembled with the main body 1 by engaging pawls 32 of the holder 3 with engagement holes (not shown) in the main body 1, and by engaging pawls 16 of the main body 1 with engagement holes 33 in the holder 3 as shown in FIG. 4.

A cover 4 is fitted between the lateral walls 15 at the front side of the holder 3. The cover 4 is assembled with the main body 1 by engaging pawls 41, 42 respectively disposed at the lateral sides and the front side of the cover 4, with engagement holes (not shown) in the main body 1. As shown in FIG. 4, the cover is provided on the inner side of the rear end thereof with support pieces 43, on which projection pieces 25 formed at the tips of the contact pieces 2 are hooked.

The contact pieces 2 are made of a resilient material. When the projection pieces 25 are hooked on the support pieces 43 as shown in FIG. 4, the projection pieces 25 resiliently come in contact with the support pieces 43 by the resiliency of the contact pieces 2 themselves, and the contacts 21 slightly project toward a memory card set position to be discussed later. Formed above the support pieces 43 are spaces 44 which allow the projection pieces 25 to be moved upward. The main body 1, the holder 3 and the cover 4 assembled in a unitary structure form the connector body.

Figure 2:
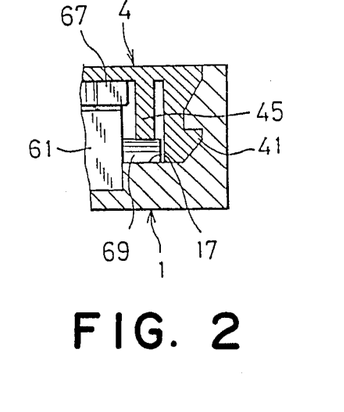
FIG. 2 is a vertical section view of a portion of the assembled memory card connector in FIG. 1, in the direction at right angles to the memory card inserting direction.

A slider 6 has a slider body 61 which is rectangular in plan elevation. The slider body 61 is provided on the reverse surface at the rear end thereof with a wide concave portion 62 as shown in FIG. 4. The standing surface of this concave portion 62 at the front side thereof serves as a pushing portion 63 for a spacer 7 to be discussed later. The standing surface of the concave portion 62 at the rear side thereof serves as a hooking portion 64 for the spacer 7. The slider body 61 is provided on the obverse surface at the rear end thereof with an engagement portion 65 adapted to be opposite to the tip of a memory card (not shown). Formed between the obverse surface and the engagement portion 65 of the slider body 61a is a space S into which a memory card is to be inserted. Disposed at both sides of the space S are arms 66 extending from both lateral ends of the engagement portion 65. The arms 66 are provided at the tip thereof with inwardly turned pawls 67. The slider 61 is also provided at both lateral sides at the front end thereof with follower portions 69. As shown in FIG. 2, the follower portions 69 are held in a manner slidable in the front-to-back direction only by guide grooves 17 (shown by virtual lines in FIG. 4) formed by downwardly projecting walls 45 of the cover 4 and the inner surfaces of the main body 1.

The slider 6 having the arrangement above-mentioned, is disposed in a manner slidable in the front-to-back direction of the connector body including the main body 1, the holder 3 and the cover 4. Tension coil springs 8 are disposed between brackets 68 formed at the rear end of the slider 6 and posts 17A disposed at the front end of the main body 1. Accordingly, the slider 6 is normally biased forward by the spring loads of the springs 8.

The spacer 7 is a roller having a circular section. When a memory card is not being inserted into the connector, the spacer 7 is disposed, as fitted in the concave portion 62 of the slider body 61 and the front-side concave portions 13, between the slider 6 and the main body 1, as shown in FIG. 4.

Figure 3:
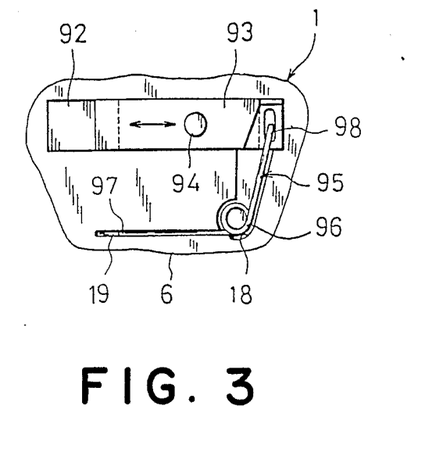
FIG. 3 is a plan view of a cam mechanism in the memory card connector in FIG. 1.

In FIG. 4, a cam mechanism 9 is disposed between the main body 1 and the slider 6. The cam mechanism 9 includes: a cam groove 91 formed in the slider body 61; a transverse groove 92 formed in the main body 1; a slide piece 93 fitted, as shown in FIG. 3, in the transverse groove 92 in a manner slidable in the transverse direction thereof (in the direction shown by an arrow in FIG. 3); a projection 94 disposed on the slide piece 93; and a spring 95 for normally biasing the slide piece 93 in a predetermined direction. In the embodiment shown in FIG. 1, the spring 95 is made in the form of a torsion spring of which torsion portion 96 is fittingly held by a support hole 18 formed in the inner surface of the main body 1. The spring 95 has one end 97 fittingly supported by a stationary groove 19 communicating with the support hole 18 and the other free end 98 engaged with the slide piece 93.

Figure 5:
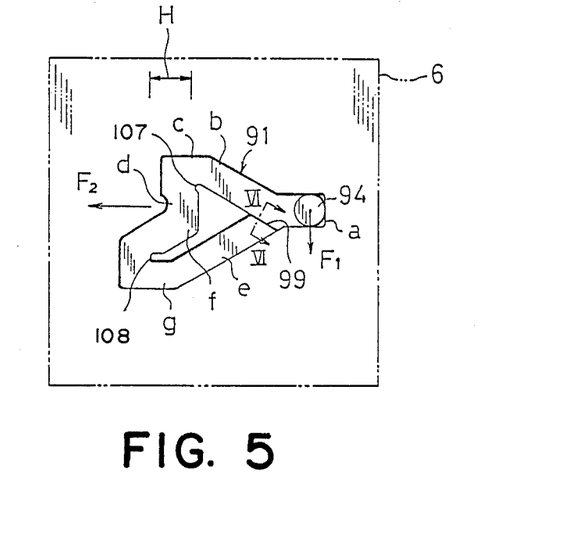
FIG. 5 is a plan view of a cam groove in the cam mechanism.
Figure 6:
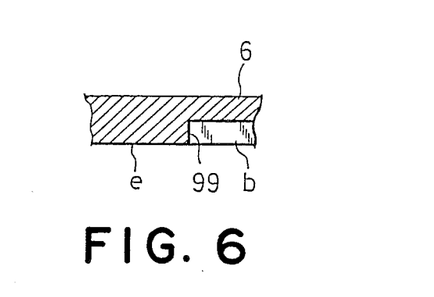
FIG. 6 is an enlarged section view taken along the line VI—VI in FIG. 5.

As shown in detail in FIG. 5, the cam groove 91 has an original point a, a going passage b obliquely and forwardly extending from the original point a, a terminal point c of the going passage b, a return passage e, an intermediate passage d connecting the terminal point c to the return passage e, a turning portion f at the intermediate point of the intermediate passage d, and a starting point g of the return passage e. Projecting portions 107, 108 project toward the intermediate passage d at the terminal point c of the going passage b and the starting point g of the return passage e, respectively. A predetermined distance H is provided, in the front-to-back direction, between the terminal point c of the going passage b and the starting point g of the return passage e. As shown in FIG. 6, a stepped portion 99 is formed at the intersecting point where the going passage b intersects the return passage e. At the stepped portion 99, the level of the going passage b is lower than that of the return passage e. In FIG. 5, F1 shows the direction in which the projection 94 is biased by the spring 95, while F2 shows the direction in which the slider 6 is biased by the springs 8.

Figure 9:
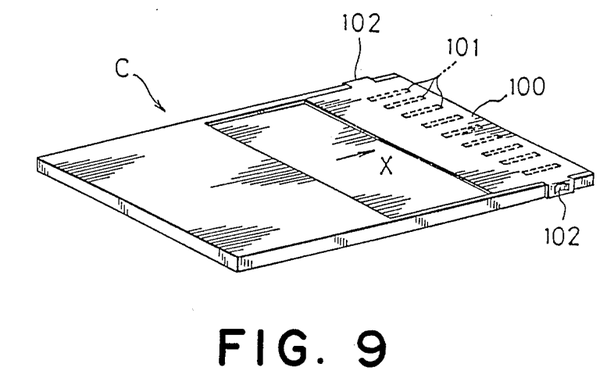
FIG. 9 is a schematic perspective view of a memory card.

FIG. 9 shows a memory card C having a shutter 100 which may take two positions, i.e., a first position where the shutter 100 covers a plurality of transversely arranged external contact pieces 101, and a second position where the external contact pieces 101 are exposed. The shutter 100 is normally so biased as to take the first position (in the direction shown by an arrow X in FIG. 9) by biasing means (not shown). The shutter 100 has slidable guide pieces 102 formed at the lateral sides of the memory card C. The guide pieces 102 have concave surfaces in the form of a circular arc.

Figure 7A:
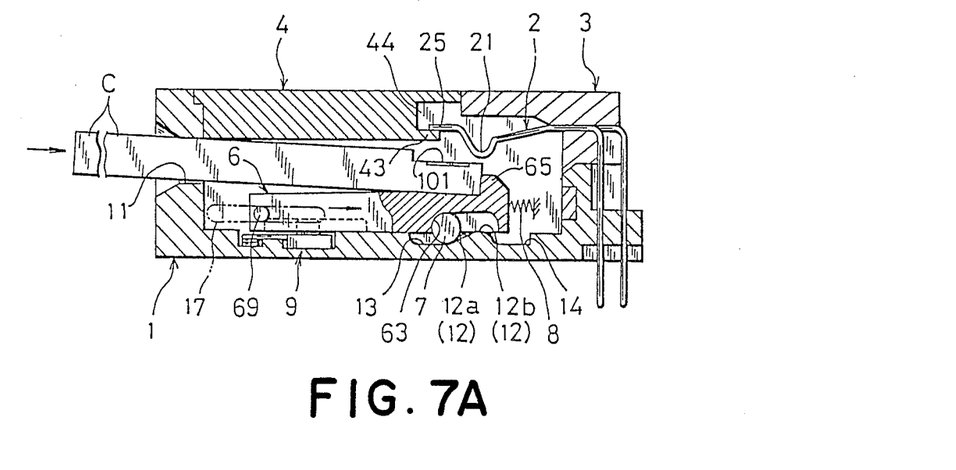
FIG. 7A to FIG. 7F are vertical views illustrating a series of steps from the insertion of a memory card to the removal thereof.
Figure 7B:
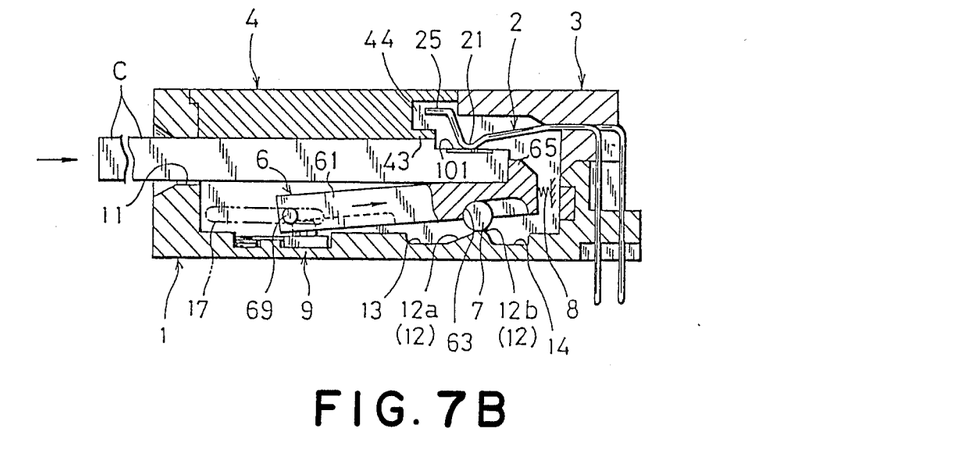
Figure 7C:
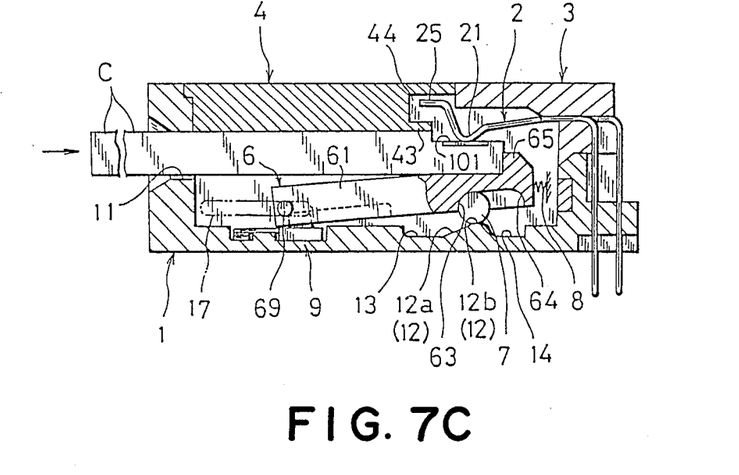
Figure 8A:
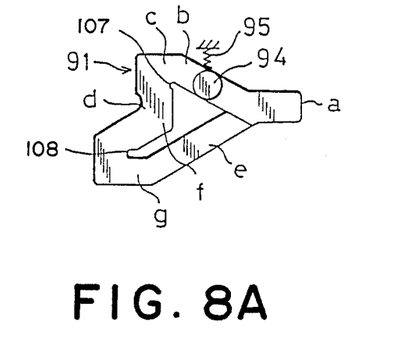
FIG. 8A to FIG. 8F are views illustrating the operation of the cam mechanism.
Figure 8B:
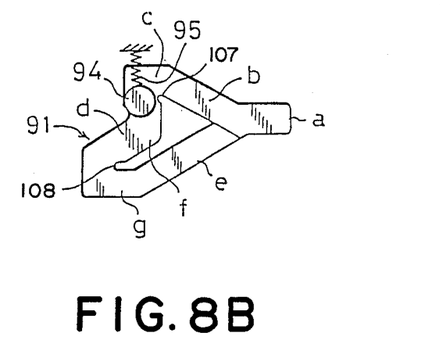
Figure 8C:
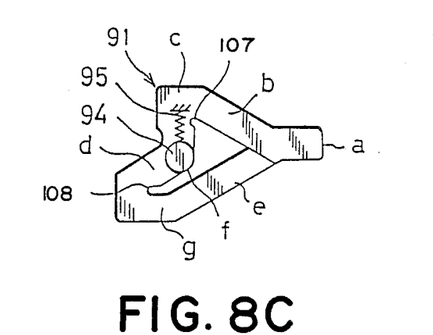
Figure 10:
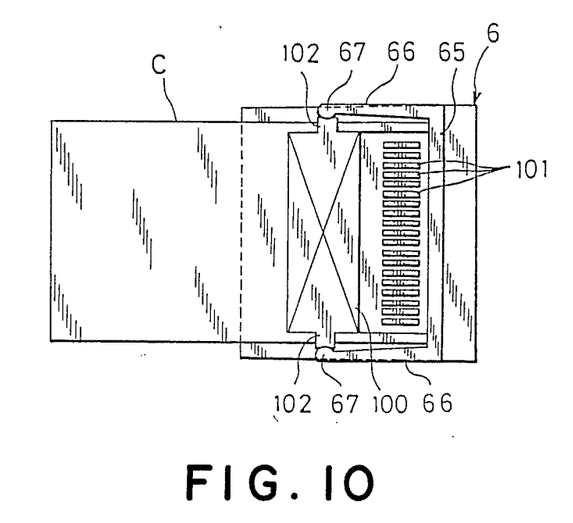
FIG. 10 is a schematic plan view of a slider of the memory card connector as engaged with a memory card.
Figure 11:
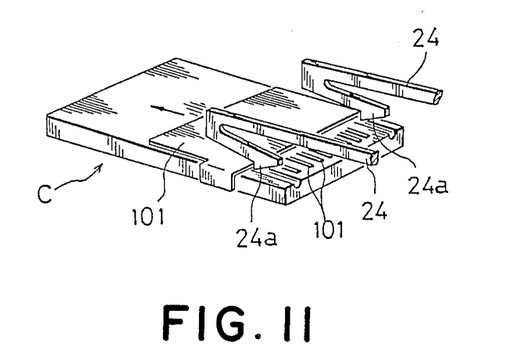
FIG. 11 is a perspective view illustrating how the shutter of a memory card is opened.
Figure 12:
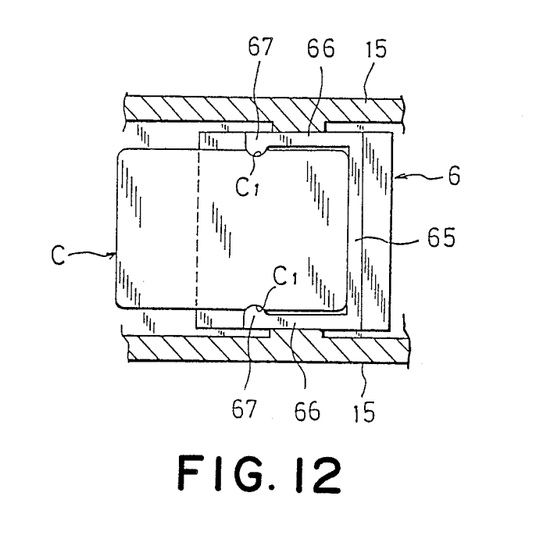
FIG. 12 is a view illustrating how the memory card is prevented from coming out from the memory card connector

While the memory card C is inserted into the card inserting and removing port 11 such that the tip of the card C is engaged with the engagement portion 65 of the slider 6 as shown in FIG. 10, pawl pieces 24a of the grounding terminals 24 are engaged with the end surface of the shutter 100 as shown in FIG. 11 to prevent the shutter 100 from moving. As a result, the shutter 100 takes the second position with respect to the memory card C such that the external contact pieces 101 are exposed. On the other hand, the pawls 67 of the slider 6 are fitted to the concave surfaces of the guide pieces 102 of the shutter 100. When the memory card C is further pushed after the tip of the memory card C has been engaged with the engagement portion 65, the slider 6 is pushed against the spring loads of the spring 8. This causes the spacer 7 to be moved, as pushed by the pushing portion 63 of the slider 6, in the concave portion 13 as shown in FIG. 7A. At this time, the external contact pieces 101 of the memory card C are located at positions lower than those of the contacts 21 of the contact pieces 2. Thus, the external contact pieces 101 do not rub against the contact pieces 2. In the cam mechanism 9, the projection 94 is located in the intermediate portion of the going passage b of the cam groove 91 as shown in FIG. 8A. When the memory card C is further pushed, the spacer 7 is pushed by the pushing portion 63 so that the spacer 7 rides front-side inclined portions 12a of the guide surfaces 12 and reaches the tops 12b of the guide surfaces 12. When the spacer 7 rides the inclined portions 12a in this way, the external contact pieces 101 of the memory card C together with the tip portion of the slider 6 are pushed by the spacer 7 and gradually raised with the follower portions 69 serving as the fulcrum. When the spacer 7 reaches the tops 12b, the external contact pieces 101 reach the set positions. While the external contact pieces 101 are initially raised and reach the set positions, the external contact pieces 101 come in contact with the contacts 21. Thereafter, such contact state of the the external contact pieces 101 with the contacts 21 is maintained to raise the same as shown in FIG. 7B. This causes the contacts 21 to resiliently come in contact with the external contact pieces 101, providing electric conduction therebetween. When the external contact pieces 101 have reached the set positions, the projection 94 gets over the projecting portion 107 and enters the intermediate passage d of the cam groove 91 in the cam mechanism 9 as shown in FIG. 8B. When the pushing force on the memory card C is released, the slider 6 is slightly pushed back by the spring loads of the springs 8 until the turning portion f of the intermediate passage d strikes on the projection 94, as shown in FIG. 8C. The turning portion f is held at this position by the projection 94. FIG. 7C shows the state where the pushing force on the memory card C is released. With the operations above-mentioned, the memory card is held at the set position. On the other hand, the memory card C itself is held by and between the pawls 67 forcibly turned to such direction that the memory card C is held by the lateral walls 15 of the main body 1, as shown in FIG. 12. This prevents the memory card C from coming out from the main body 1. In the memory card C having the shutter 100 as shown in FIG. 9, the pawls 67 hold the memory card C through the guide pieces 102 of the shutter 100. In FIG. 12, the pawls 67 are fittingly engaged with concaves $C_1$ formed in the lateral sides of the card C.

Figure 7D:
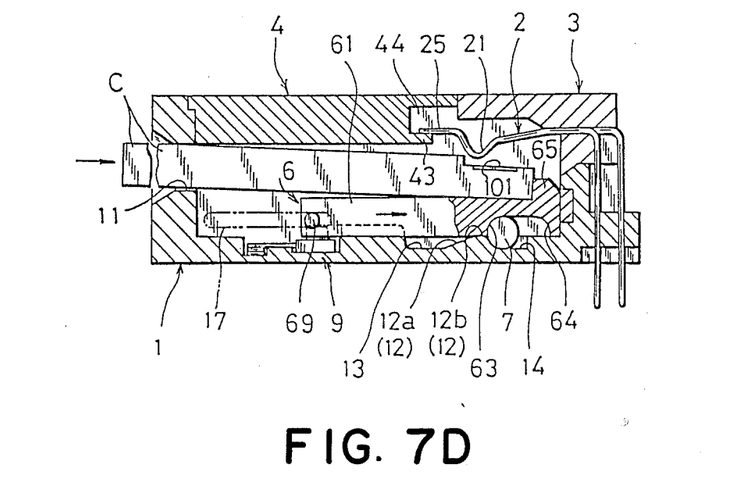
Figure 7E:
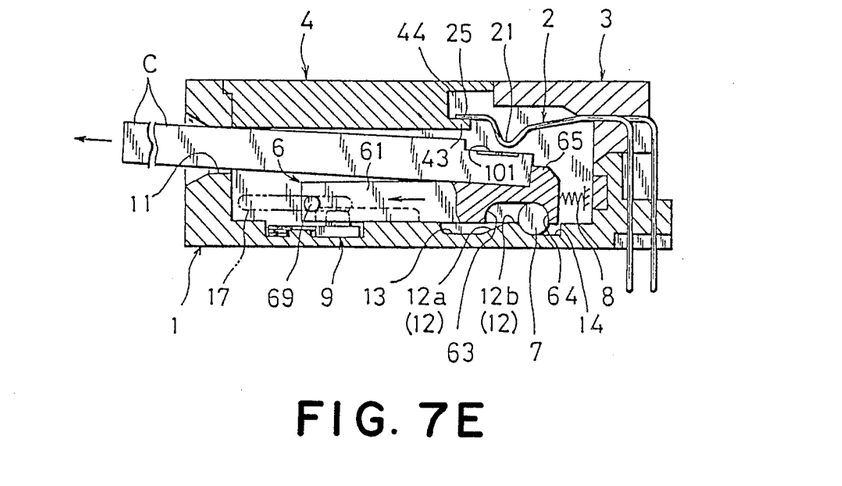
Figure 7F:
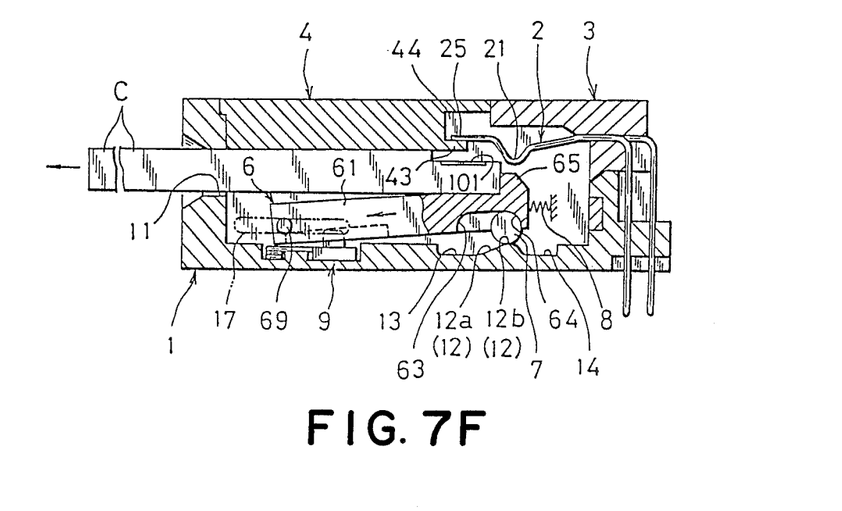
Figure 8D:
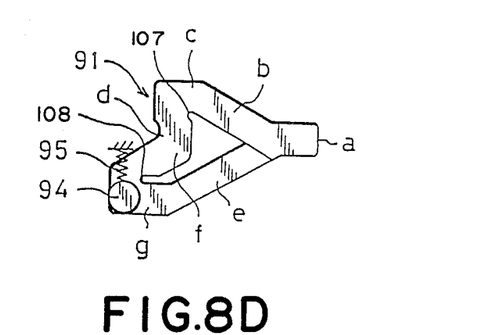
Figure 8E:
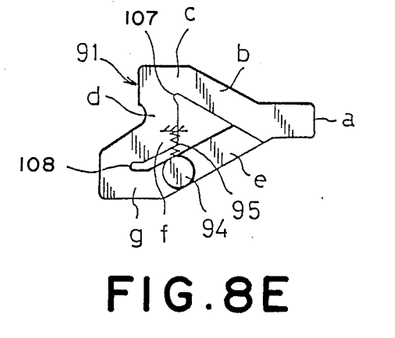
Figure 8F:
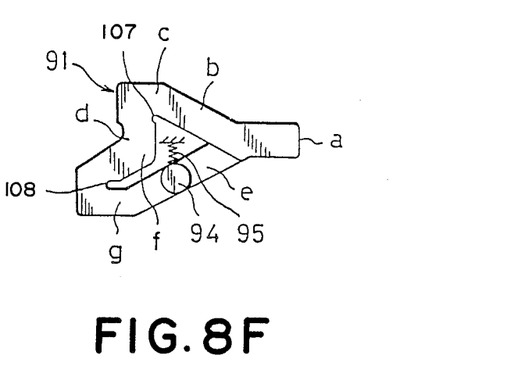

For pulling out the memory card C, the memory card C is further pushed. This causes the lock state by the connector-side lock mechanism to be automatically released. At the same time, the slider 6 is further pushed so that the spacer 7 pushed by the pushing portion 63 gets over the guide surfaces 12 and enters the concave portions 14, as shown in FIG. 7D. Accordingly, the external contacts 101 of the memory card C together with the slider 6 are moved downward from the set positions above-mentioned and separated from the contacts 21. Accordingly, the contact pieces 2 are returned to the original positions. At this time, the cam mechanism 9 is operated as shown in FIG. 8D in which the starting point g of the return passage e is opposite to the projection 94. Afterwards, when the pushing force of the memory card C is released, the slider 6 is pushed forward by the spring loads of the springs 8 and the projection 94 enters the return passage e as shown in FIG. 8E. Accordingly, the state where the slider 6 is positioned by the cam mechanism 9 is released, and the spacer 7 is caught by the hooking portion 64 of the slider 6 as shown in FIG. 7E. Then, when the slider 6 is pushed by the spring loads of the springs 8, the projection 94 passes through the return passage e of the cam groove 91 as shown in FIG. 8F. The spacer 7 caught by the hooking portion 64 gets over the guide surfaces 12 through the tops 12b from the back-side concave portions 14. It is noted that the external contact pieces 101 pass under the contacts 21 while the spacer 7 is located in the concave portions 14. When the spacer 7 reaches the tops 12b of the guide surfaces 12, the external contact pieces 101 have been already moved forward with respect to the contacts 21. Accordingly, when pulling out the memory card C, the contacts 21 do not resiliently come in contact with the external contact pieces 101.

When the memory card C is pulled out after the slider 6 has been pushed to the position shown in FIG. 4, the shutter 100 gets out from the pawls 24a of the grounding terminals 24 and moves to cover the external contact pieces 101.

In this embodiment, the cam mechanism 9 is arranged such that the projecting portion 97 at the terminal point c of the going passage b in the cam groove 91 projects only slightly toward the intermediate passage d. Accordingly, the position of the slider 6 as pushed at the time when the memory card C is inserted, is substantially equal to the position of the slider 6 at the time when the memory card C is held at the set position. Accordingly, the external contact pieces 101 of the memory card C do not rub so much against the contacts 21. This advantageously minimizes wear of the external contact pieces 101 and the contacts 21 due to such rubbing. The spacer 7 should not be limited to that shown in FIG. 1, but may be spherical or may have other section than a circular section.

What is claimed is:

1. A memory card connector comprising:
   a connector body defining a front-to-back direction;
   contact pieces mounted on said connector body and positioned as projecting toward a set position of a memory card, said contact pieces being movable in a direction away from said set position;
   a raised guide surface formed on said connector body;
   resilient means;
   a slider mounted on said connector body in a manner slidable in the front-to-back direction thereof, said slider being normally biased forward by said resilient means;
   a spacer disposed between said connector body and said slider in a manner movable in the front-to-back direction;
   an engagement portion disposed on said slider, said engagement portion being adapted to be opposite to the tip of a memory card when the same is inserted;
   a pushing portion disposed on said slider such that, when said slider is pushed by the memory card, said pushing portion pushes said spacer so that said spacer gets over said guide surface from the front side thereof to the rear side thereof;
   a hooking portion disposed, as separated from said pushing portion, on said slider such that, when said slider is pushed against said resilient means, said hooking portion catches said spacer, causing said spacer to get over said guide surface from the rear side thereof to the front side thereof; and
   a cam mechanism disposed between said connector body and said slider and arranged such that, when said spacer rides the top of said guide surface from the front side thereof, said cam mechanism operates to hold said slider at a position where the memory card is held at said set position, and such that, when said slider is further pushed from said position such that said spacer gets over said raised portions of said guide surface, said cam mechanism operates to release said slider from said position.

2. A memory card connector as set forth in claim 1, further comprising pawls adapted such that, when a memory card having a shutter movable between a first position where the external contact pieces of said memory card are covered and a second position where the external contact pieces are exposed, is inserted into the connector body, said pawls are engaged with the shutter in the middle course of such insertion, thereby preventing the shutter from moving, causing said external contact pieces to be exposed.

3. A memory card connector as set forth in claim 2, wherein the contact pieces having grounding terminals disposed at both sides thereof and wherein the pawls are disposed on the grounding terminals.

4. A memory card connector as set forth in claim 1, wherein the spacer is a roller having a circular section.

5. A memory card connector as set forth in claim 2, wherein the spacer is a roller having a circular section.

6. A memory card connector as set forth in claim 3, wherein the spacer is a roller having a circular section.

* * * * *